United States Patent
McNabney et al.

(10) Patent No.: US 9,341,279 B2
(45) Date of Patent: May 17, 2016

(54) MAGNETIC ROTARY ACTUATOR

(71) Applicant: Safoco, Inc., Houston, TX (US)

(72) Inventors: Jason McNabney, Conroe, TX (US); Mustafa Ahmad A. Alalawi, Humble, TX (US)

(73) Assignee: Safoco, Inc., Houston, TX (US)

(*) Notice: Subject to any disclaimer, the term of this patent is extended or adjusted under 35 U.S.C. 154(b) by 122 days.

(21) Appl. No.: 14/231,737

(22) Filed: Mar. 31, 2014

(65) Prior Publication Data

US 2014/0291561 A1 Oct. 2, 2014

Related U.S. Application Data

(60) Provisional application No. 61/806,641, filed on Mar. 29, 2013.

(51) Int. Cl.
*F16K 5/00* (2006.01)
*F16K 31/05* (2006.01)
*F16K 5/06* (2006.01)
*H02K 7/14* (2006.01)

(52) U.S. Cl.
CPC . *F16K 31/05* (2013.01); *F16K 5/00* (2013.01); *F16K 5/0652* (2013.01); *H02K 7/14* (2013.01); *Y02E 60/16* (2013.01)

(58) Field of Classification Search
CPC ......... F16K 31/05; F16K 5/00; F16K 5/0647; F16K 5/0652; H02K 7/14; Y02E 60/16
USPC .................. 251/76–77, 129.03, 304, 315.01, 251/315.08, 315.1
See application file for complete search history.

(56) References Cited

U.S. PATENT DOCUMENTS

| | | | | |
|---|---|---|---|---|
| 1,596,968 A | * | 8/1926 | Hansen | F16K 31/10 236/75 |
| 1,767,158 A | * | 6/1930 | Thomas | F16K 31/046 236/75 |
| 1,898,242 A | * | 2/1933 | Chandler | H02P 3/12 137/552 |
| 1,943,854 A | * | 1/1934 | Beckwith | F16K 31/05 251/249.5 |
| 2,574,428 A | * | 11/1951 | Wheatley | F16K 5/184 137/270 |
| 2,855,940 A | * | 10/1958 | Milleville | F16K 31/05 137/1 |
| 2,971,400 A | * | 2/1961 | Milleville | F16K 31/05 251/129.03 |
| 2,992,807 A | * | 7/1961 | Henning | F16K 31/047 251/129.12 |
| 3,001,412 A | * | 9/1961 | Babbitt | F16K 31/60 251/76 |

* cited by examiner

*Primary Examiner* — John Bastianelli
(74) *Attorney, Agent, or Firm* — Bushman Werner, P.C.

(57) ABSTRACT

An automated impactor turn wheel capable of being activated and used to turn valves from a remote location. In certain instances, the impactor turn wheel is contemplated to turn a ball valve. The improved impactor turn wheel will generate increased torque which will allow improved operation of a ball valve in high pressure applications.

6 Claims, 4 Drawing Sheets

MAGNETIC ROTARY ACTUATOR

PRIORITY

This application claims priority to U.S. Provisional Application 61/806,641, filed on Mar. 29, 2013, the contents of which are specifically incorporated herein.

BACKGROUND

In oil and gas development or operations, time is money. The longer it takes to perform a task the more money that is being spent. Currently in many high-pressure petroleum applications gate valves are used which require a turn wheel to open and/or close the gate valve. Workers in such fields may often open and close gate valves under high pressures of greater than 5,000 psi. Often the time required to open and/or close the gate valve is in the range of 7-60 minutes due to the number of turn wheel turns required to open and/or close the gate valve. The art field is in need of a valve that can be opened and/or closed in a shorter amount of time.

A valve capable of opening more quickly or with less effort would be beneficial in the art field. In general, a ball valve is capable of opening at a 90 degree turn. A Ninety (90) degree turn will take only a fraction of the number of turn wheel turns as compared to a gate valve. Consequently, the length of time required to open or close the valve is also greatly reduced. It would therefore be advantageous to use a ball valve which would have a quicker open and close time in high pressure petroleum applications.

Those skilled in the art will realize that ball valves are generally considered not to be functional for oil and gas operations due to the pressures in the conduits or lines, contaminants, and/or the like. The fluid produced from many geological formations contains minute, abrasive particles, such as sand, which lodge between the ball and seat and wear away the valve components. Over a period of time, the rotational ability of prior art valves may be reduced, thus requiring higher torque to turn such a valve. In some wells, where the production fluid is particularly sandy or corrosive, these ball valves may be particularly prone to a decrease in rotational ability.

While the use of an impactor turn wheel can increase the speed in which a ball valve is changed from the open position to the closed position and vice versa, such devices require extra strength of oilfield workers. Additionally, ball valves with turn wheels may be positioned in such a manner as to be inconvenient for an oilfield worker to reach. A third consideration, especially in high pressure applications, is that such pressure may pose a danger to workers such that they may want to have some distance between them and the ball valve in case of valve or pipe failure. This may be of concern in high pressure applications such as hydraulic fracturing or where gas is expanding rapidly as it escapes from underground.

SUMMARY

Example embodiments of the present disclosure provide a magnetic rotary actuator. Briefly described, in architecture, one example embodiment of the disclosure, among others, can be implemented as follows: including a turn wheel having a substantially circular shape, with an outer edge defining an outer circumference of the turn wheel and an axis bore centered within the turn wheel and equidistant from any two points on the outer edge, the outer edge further having an outward facing side oriented away from the axis bore and an inward facing side oriented toward the axis bore, the axis bore capable of independent rotation with respect to the outer edge, a plurality of outward facing electromagnets, each electromagnet having an inward side operatively attached to the turn wheel outer edge, the plurality of outward facing electromagnets circumferentially positioned around the turn wheel outer edge, an outer wheel with a circumference greater than the turn wheel outer edge and circumferentially positioned around the outward facing electromagnets, the outer wheel comprising a plurality of inward facing electromagnets circumferentially positioned around the plurality of outward facing electromagnets and an outer wheel support configured to position the outer wheel around the plurality of inward facing electromagnets, and conductive wires connecting the inward and outward facing electromagnets to at least one controller.

Embodiments of the present disclosure can also be viewed as providing methods for providing a magnetic rotary actuator. In this regard, one embodiment of such a method, among others, of opening or closing a valve from a remote location can be broadly summarized by the following steps: obtaining the magnetic rotary actuator as described herein, connecting the conductive wires to a computer, running a program on the computer designed to activate electromagnets and change the polarity of selected electromagnets, providing a signal to the computer to run the program, wherein the program communicates to the computer to activate and change the polarity of selected electromagnets thereby turning the impactor turn wheel having electromagnets and the outer wheel, and where the last part is repeated until the valve moves from an open position to a closed position or vice versa.

Still further, in embodiments of the disclosure include a magnetic rotary actuator including a valve case having a first valve bore and a second valve bore, a valve member situated within the valve case and the valve member comprising a throughbore defining a flow axis, a stem having a proximal end attached to the valve member and a distal end extending away from the valve member and across the valve case through a stem bore, a turn wheel having a substantially circular shape, the turn wheel including a turn wheel outer edge defining an outer circumference, the edge having an outward facing side oriented away from the distal end of the stem, and an inward facing side oriented toward the distal end of the stem, an inward facing turn wheel stem bore, the turn wheel stem bore centered about equidistant from the turn wheel outer edge, the stem bore operatively attached to the distal end of the stem, the stem bore operable to independently rotate with respect to the outer edge, at least one hammer, the at least one hammer affixed to the inward facing side of the turn wheel outer edge, the hammer oriented to strike at least one strike target, at least one strike target extending outwardly from the stem or the turn wheel stem bore such that at least a portion of the strike target is configured to impact the hammer, a plurality of outward facing electromagnets, each electromagnet having an inward side operatively attached to the turn wheel outer edge, the plurality of outward facing electromagnets circumferentially positioned around the turn wheel outer edge, an outer wheel with a circumference greater than the turn wheel outer edge and circumferentially positioned around the outward facing electromagnets, the outer wheel comprising a plurality of inward facing magnets circumferentially positioned around the plurality of outward facing electromagnets and an outer wheel support configured to position the outer wheel around the plurality of outward facing electromagnets, and conductive wires connecting the outward facing electromagnets to at least one controller configured to activate the plurality of outward facing electromagnets.

In the embodiments of the magnetic rotary actuator concerning the controller, the controller may be any controller, in specific embodiments, the controller is a computer.

The foregoing has outlined rather broadly the features of the present disclosure in order that the detailed description that follows may be better understood. Additional features and advantages of the disclosure will be described hereinafter, which form the subject of the claims.

Figure 1:
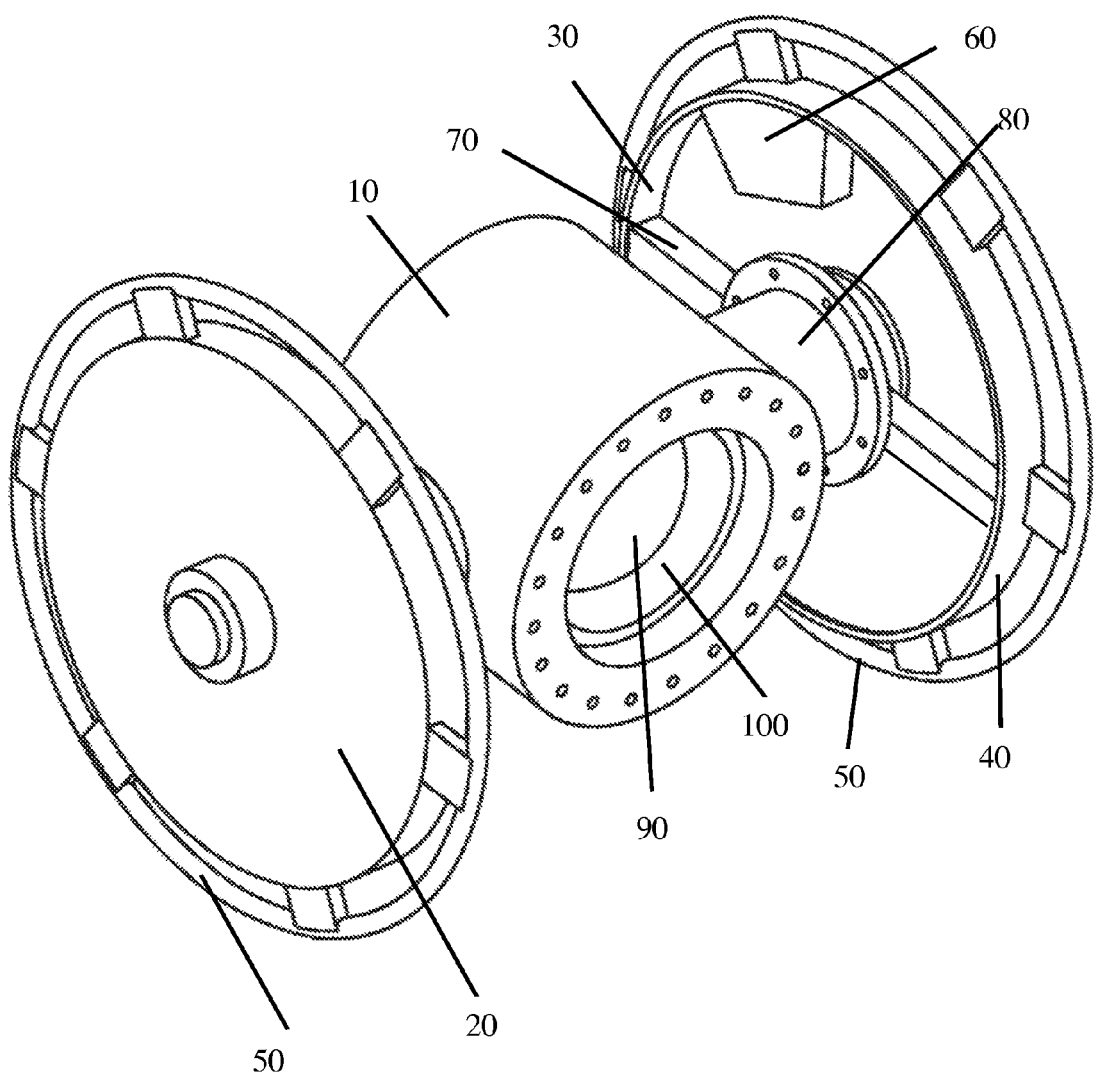
FIG. 1 is an illustration of a ball valve of the present disclosure.

LIST OF REFERENCE NUMERALS 10 ball valve body
20 turn wheels/impactor turn wheels
30 inner wall
40 outer wall
50 turn wheel handles
60 hammer
70 strike targets
80 bearing housing
90 ball
100 flow axis
110 proximal stem
120 distal stem
130 dovetail stem connector
140 stem groves
150 ball valve seats
170 stem bonnet
180 ware bushings
190 packing
200 packing gland
210 bonnet
230 stem distal end
240 outward facing electromagnets
250 outer wheel
260 inward facing electromagnets
270 outer wheel support spokes
280 spokes
290 controller
300 conductive wires

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In the following description, numerous details are set forth to provide an understanding of the present disclosure. However, it will be understood by those of ordinary skill in the art that the present disclosure may be practiced without these details and that numerous variations or modifications from the described embodiments may be possible. The disclosure will now be described with reference to the figures, in which like reference numerals refer to like, but not necessarily the same or identical, elements throughout. For purposes of clarity in illustrating the characteristics of the present disclosure, proportional relationships of the elements have not necessarily been maintained in the figures.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

As used herein, the term "pipe" means and refers to a fluid flow path.

As used herein, the term "conduit" means and refers to a fluid flow path.

As used herein, the term "line" means and refers to a fluid flow path.

As used herein, the term "hydraulic fracturing" (also called "fracking"), a method for extracting oil and natural gas.

As used herein, the term "electromagnet" or "electro-magnet" means and refers to a type of magnet in which the magnetic field is produced by the flow of electric current.

As used herein, the term "fluid" refers to a non-solid material such as a gas, a liquid or a colloidal suspension capable of being transported through a pipe, line or conduit. Examples of fluids include by way of non-limiting examples the following: natural gas, propane, butane, gasoline, crude oil, mud, water, nitrogen, sulfuric acid and the like.

As used herein, the term "attached," or any conjugation thereof describes and refers to the at least partial connection of two items.

Various embodiments of the present disclosure generally relate to methods, devices and/or systems for increasing the amount of torque which can be applied to a ball valve, such as a stuck or partially stuck ball valve or a ball valve which resists low torque rotation.

In certain embodiments, the ball within the ball valve may have stems above and below the ball or perpendicular to the fluid or gas flow through the valve.

In the embodiments of the present disclosure, the ball may be attached to a pair of stems perpendicular to the flow of the fluid or gas through the valve when in the opened position. Typically the stems extend through the ball valve casing and protrude from the ball valve in opposite directions.

Still further, in certain embodiments the distal ends of the stems, which is defined as the ends of the stems furthest away from the ball are attached or otherwise affixed to turn wheels, such that the stems form the center axis of the wheels. In certain embodiments, the wheels are at the absolute distal ends of the stems and are affixed to the stems. In certain other embodiments, the wheels are at a position distal to the ball and the valve case, but are intermediate to the extreme distal end of the stems.

In such aforementioned embodiments concerning the distal end of the stem and the wheels, the wheels may be bolted, welded, screwed, pinned to the stems or mounted on tapered distal ends of the stems wherein the center of the wheel receives the tapered distal end, such that turning the wheel or wheels applies torque to the stems and results in rotation of the ball within the ball valve.

In particular embodiments concerning the wheel of the present disclosure, the wheel is an impactor turn wheel. The wheel may be employed to provide torque to rotate the ball within the ball valve. In certain embodiments, two impactor turn wheels are employed. In other embodiments, only one impactor turn wheel is employed. In embodiments wherein only one impactor turn wheel is employed, a stem type ball valve may or may not be used. In lieu of a stem type ball valve, a floating ball valve with a valve stem may be employed when only one impactor turn wheel is employed.

Generally speaking, an impactor turn wheel has a strike target directly coupled to the stem. Thus, the turn wheel pushes against a strike target to apply the torque.

In such instances, after the valve has been closed to a partial-tight position, the turn wheel is backed off a bit (<½ turn, typically) but the impact target stays in position (i.e. valve remains partially closed). The turn wheel is then spun quickly in the closing direction so that is 'impacts' the impact target providing the much higher torque required to properly seat the valve.

Without the use of electromagnets, in large or high pressure valves, it may take several men to apply the torque required to turn the wheel. With the use of electromagnets in an impactor turn wheel, the instantaneous torque applied when the turn wheel strikes the impact target can be much greater than one person could apply with a standard turn wheel. The series of turns can be reversed to move the ball valve in the opposite direction.

In certain embodiments, the electromagnetic impactor turn wheel may have a single strike target such that the turn wheel can be rotated nearly 360 degrees before striking the strike target. In other embodiments, the electromagnetic impactor turn wheel may have two strike targets located 180 degrees from each other such that the electromagnetic impactor turn wheel be rotated nearly 180 degrees before striking the strike target. Alternative embodiments exist with a higher number of strike targets wherein the strike targets are spaced at equidistant angles from each other around the valve stem or distal end of a stem.

In certain embodiments, out of convenience, the electromagnetic portion of the turn wheel may be retrofitted to a standard impactor turn wheel. However, it is also conceived that the electromagnetic portion of the turn wheel may be constructed so as to be a part of the impactor turn wheel.

In embodiments concerning the electromagnets, electromagnets may be placed on the impactor turn wheel so that they are facing outward from the center axis of the turn wheel. In certain embodiments, there is one electromagnet. In certain other embodiments, there are two electromagnets spaced about 180 degrees apart. In certain other embodiments, there are three electromagnets spaced about 120 degrees apart. In certain other embodiments, there are four, five or more electromagnets arranged in an equal spacing facing outward from the turn wheel. In preferred embodiments, the circumference of the turn wheel is covered with electromagnets, each being spaced one after another so as to complete the turn wheel circumference.

In such embodiments wherein the electromagnets face outward from the center axis of the turn wheel, opposing magnets may face inward from a magnet wheel, which would be larger in circumference than the turn wheel and within the same plane as the turn wheel such that the turn wheel was freely capable of rotation within the magnet wheel. In such embodiments, the magnet wheel may have opposing electromagnets facing inward from the magnet wheel in about the same number as the electromagnets facing outward from the turn wheel. Further, in such embodiments, the inward facing magnets and the outward facing magnets are not touching.

In such embodiments, wherein the electromagnets are activated, the magnet set attached to the turn wheel will spin rapidly, propelling the turn wheel in a clockwise or counter-clockwise direction. This action will cause the impactor hammers to slam into the strike target in order to open or close the ball valve. In order to spin the turn wheel in the opposite direction, the polarity of the magnets can be changed through changing of the polarity of the electrical signal sent to the electromagnets.

Further, concerning the polarity of the inward facing electromagnets and the outward facing electromagnets, and in particular, when the inward facing magnet wheel has a plurality of electromagnets surrounding the turn wheel and, likewise the turn wheel has a plurality of electromagnets facing the magnet wheel, the polarity can be modulated in a number of ways. In certain embodiments, the polarity of the electromagnets in the magnet wheel remains the same while the polarity of the electromagnets on the turn wheel changes or reverses in order to rotate the turn wheel. In other embodiments, the polarity of the electromagnets in the magnet wheel changes or reverses while the polarity of the electromagnets on the turn wheel remains the same in order to rotate the turn wheel. In other embodiments, the polarity of the electromagnets on the magnet wheel and the polarity of the electromagnets on the turn wheel alternate such that the turn wheel is able to rotate by the propulsion and repulsion associated with opposite and same polarities of the electromagnets.

In such embodiments wherein the polarities of the electromagnets change to rotate the turn wheel, the control of polarity may be through a computer program within a computer having a central processing unit, the computer operatively connected to the electromagnets such that they change polarity upon user activated instructions to rotate the turn wheel. In other embodiments, such a computer program may result in changes in electromagnet polarity upon a certain time, or a certain preplanned event, or upon a certain signal, such as a pressure signal within the fluid conduit or at the valve of the ball valve.

In embodiments wherein an electrical signal is transmitted to the electromagnets to change polarity, the signal may be transmitted via a conductive wire or conductive cable with a positive or negative charge. In such embodiments, the wire or conductive cable may be insulated from the surrounding atmosphere through an insulating material such as a rubber, a plastic, an insulating fabric and the like. Likewise, each of the electromagnets may be insulated from the surrounding atmosphere through an insulating material such as a rubber, a plastic, an insulating fabric and the like. In certain embodiments, the conductive wire or conductive cable has the same insulating material as the insulating material used to cover the electromagnets. In other embodiments, the insulating material is different.

As shown in FIG. 1 is a ball valve of the present disclosure employing a ball valve body 10. Two impact turn wheels 20 are affixed to the stems (not shown). While it is contemplated that in many embodiments, each stem will be affixed to an impact turn wheel, there are other embodiments readily conceived wherein only one turn wheel is needed or desired. The impact turn wheels have an inner wall 30 and an outer wall 40. Affixed to the outer wall are turn wheel handles 50 and affixed to the inner wall is a hammer 60. Additionally, the impact turn wheels have strike targets 70 such that rotation of the turn wheel causes impact of the hammer 60 against the strike targets 70. The strike targets in turn are affixed to the stem such that the stem will rotate the ball upon impact of the hammer 60 against the strike target 70. Alternatively, the strike targets 70 can also be directly affixed to the impact turn wheel 20, which is in turn attached to a stem. In this instance impact of the strike target with the hammer 60 would result in torque being applied to the stems as well. The stems are protected from being bent or cleaved by the attachment of bearing housing 80 to the valve case and the valve cap. Also shown in this figure are the ball 90 and the flow axis 100.

Figure 2:
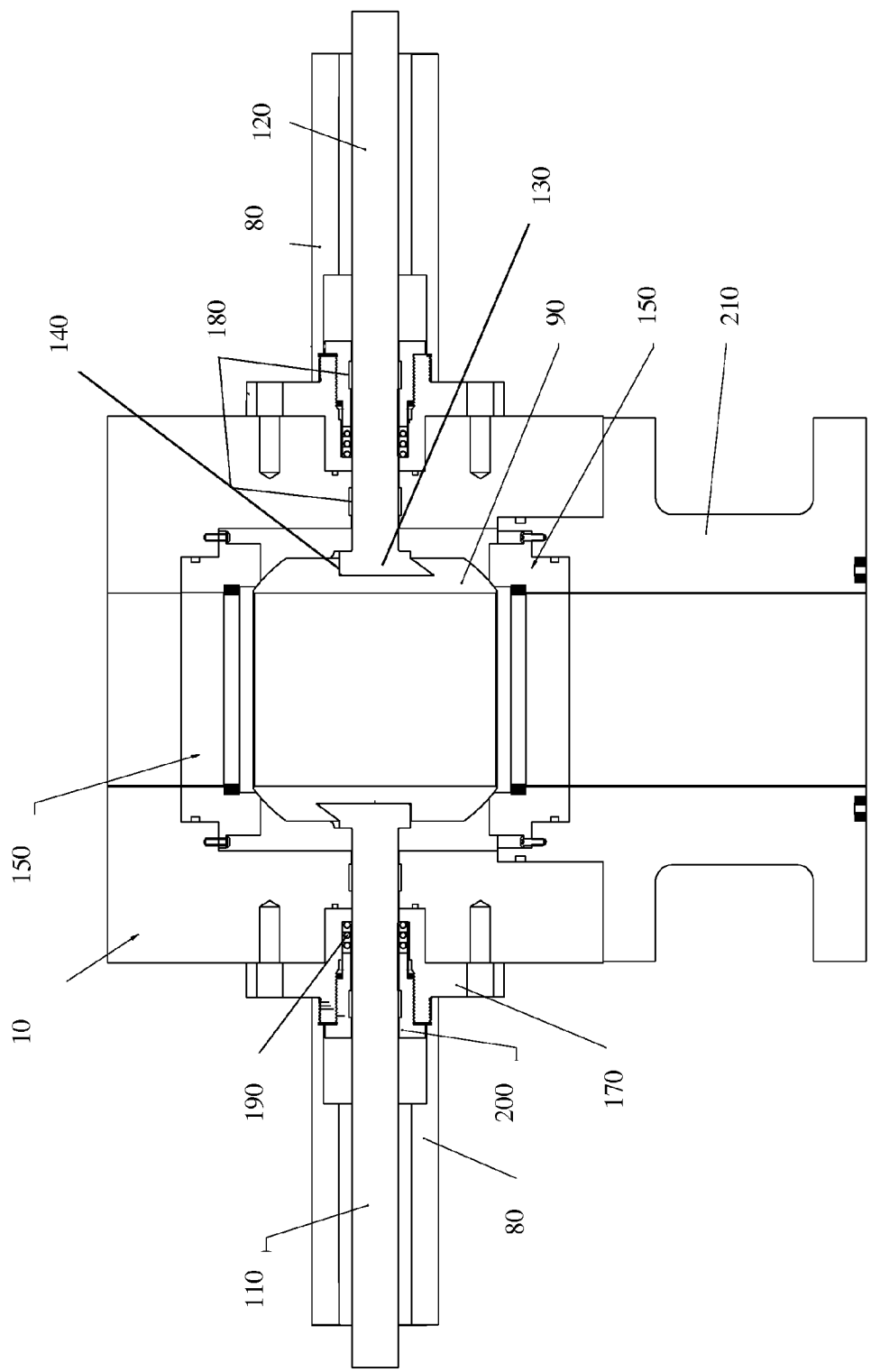
FIG. 2 is an illustration of a cross section of an alternative embodiment of a ball valve design.

FIG. 2 is a cross section of an alternative embodiment of a ball valve design. In this embodiment, the proximal 110 and distal 120 stems may be viewed as being attached to the ball 90 via the wedge shaped stem connector sliding into the retaining grooves on the ball. This embodiment allows a ball without stems to be placed into the ball valve body 10 and positioned between the two stems by sliding the dovetail stem connectors 130 into the stem grooves 140. In this embodiment, but contemplated for other embodiments, wear bushings 180 may at least partially surround the stems. Still further, packing 190 may at least partially surround the stems as they exit the stem bores. A stem bore may further comprise a packing gland 200. In turn, surrounding the packing gland may be a stem bonnet 170 with an inward facing side facing the packing gland and an outward facing side facing the ball valve case. Further, the stem bonnet 170 will be oriented such that the proximal end of the stem bonnet 170 will face the ball 90.

The ball 90 in certain embodiments may be enclosed in the ball valve body 10 by the positioning of ball valve seats 150. Preferably, a ball valve seat 150 is used on both sides of the ball 90. However, it is contemplated that the ball valve body 10 may itself retain the ball as it is positioned within the ball valve body 10 so that only one ball valve seat 150 is employed. Covering the ball valve seat 150 in some embodiments may be bonnet 210 with a proximal end toward the seat and a distal end away from the seat. The distal end of the bonnet 210 can be welded, bolted or otherwise affixed to pipe. Alternatively or additively, pipe may be directly affixed to the valve case as illustrated in previous embodiments.

Figure 3:
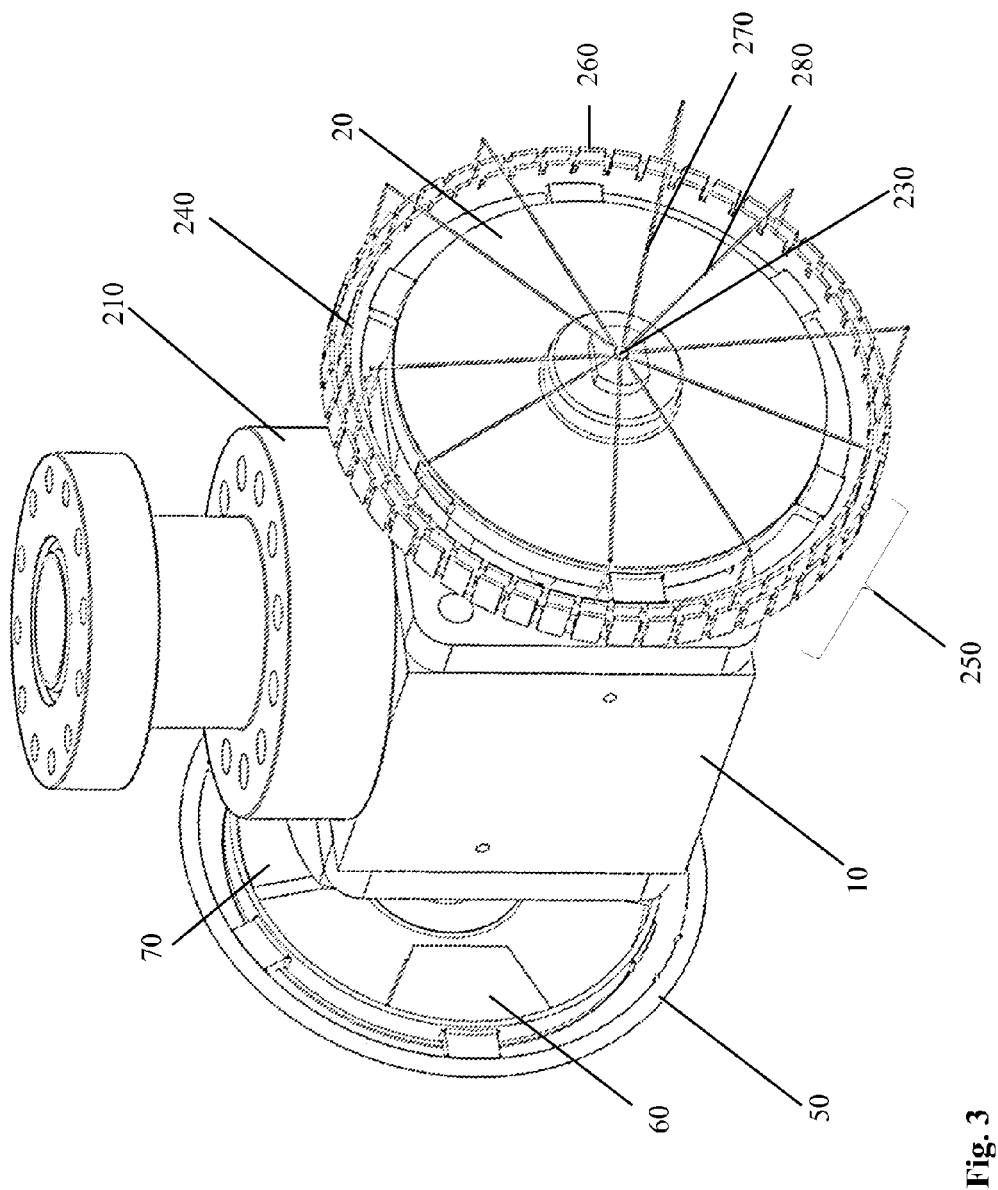
FIG. 3 illustrates an embodiment of the magnetic rotary actuator in electromagnetic impactor turn wheel form.

FIG. 3 illustrates electromagnetic impactor turn wheels of the present disclosure. As can be seen in FIG. 3 a ball valve body 10 is attached to a bonnet 210 which can in turn be connected to pipe for the transport. Also depicted in FIG. 3 are impactor turn wheels 20 with turn wheel handles 50. The inside of the impactor turn wheels 20 depicts a hammer 60 and a strike target 70. As can be seen the impactor turn wheels 20 are mounted on the stem distal end 230. The turn wheel handle 50 has mounted on it outward facing electromagnets 240 surrounding the outward facing electromagnets 240 is the outer wheel 250 with inward facing electromagnets 260. The outer wheel 250 surrounds the turn wheel handle 50 and is supported by outer wheel support spokes 270 which may be rigid to support the outer wheel. Likewise, they may have a sufficient diameter and be of a sufficient strength to support the magnet wheel and the inward facing electromagnets. Likewise, the outward facing electromagnets 240 are connected to spokes 280. In this illustration, each of the spokes 280 and the outer wheel support spokes 270 converges at the stem distal end 230. Both the spokes 280 and the outer wheel support spokes 270 also function as insulated wires capable of changing the polarity of the outward facing electromagnets 240 and the inward facing electromagnets 260, respectively. These insulated wires can be connected to additional wires or cables running to a computer or other electronic device to allow changing of polarity. In some embodiments, not demonstrated here, the turn wheel handle 50 may be omitted. In such embodiments, the outward facing electromagnets 240 are directly positioned on the outward edges of the impactor turn wheels 50. However, the presence of a turn wheel handle may be useful in cases where there is an electronic failure and the ball valve must be turned manually.

Regarding the spokes 280 and the outer wheel support spokes 270, as indicated previously these may be conductive, insulated and connected to an electronic controller. Such an electronic controller may switch the polarity of the inward facing electromagnets 260, the outward facing electromagnets 240. Alternatively or additively, the controller may send a signal to the spokes to switch the polarity of both the inward facing electromagnets 260. The signal may change the polarity of alternate inward facing electromagnets 260, all or a subset of outward facing electromagnets 240 or both. Such a signal in any configuration is contemplated to result in the impactor turn wheels 50 rotating such that the hammer 60 strikes the strike target 70 due to forced rotation of the impactor turn wheel 20 from the changes in electromagnet polarities. Ideally, such impact between the hammer 60 and the strike target 70 is sufficient to at least partially turn the ball 90 within the ball valve body 10.

In further embodiments referring to the spokes 280 and the outer wheel support spokes 270 which are connected to a controller, the controller may be a computer. In certain embodiments, a method for changing the polarity of all or a subset inward facing electromagnets 260, all or a subset of outward facing electromagnets 240 or both, in order to turn or rotate the impactor turn wheel 50, is mediated by a computer which implements various procedures and operations of the method in the form of computer executable program code, computer executable and computer readable media, and other hardware, firmware and software module, network, application and interface platforms upon which the method is carried out.

Figure 4:
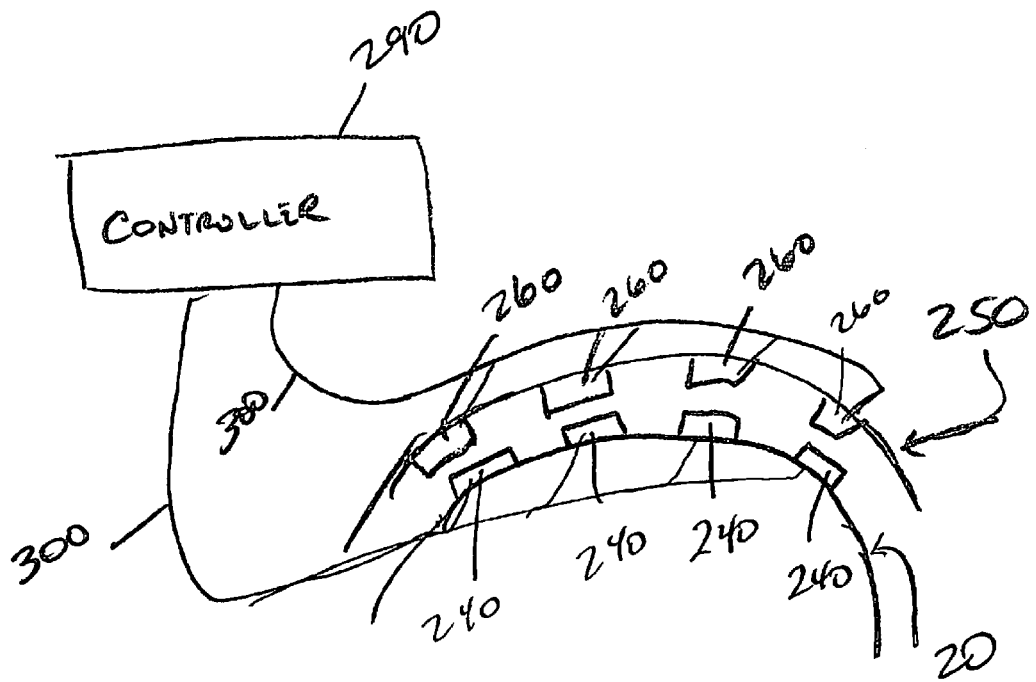
FIG. 4 illustrates a functional view an embodiment of the present disclosure.

FIG. 4 illustrates a functional view an embodiment of the present disclosure. Controller 290 is connected to a plurality of inner 260 and outer facing 240 electromagnets via one or more conductive wires 300. Inner facing electromagnets 260 are positioned inside of outer wheel 250. Outward facing electromagnets 240 are positioned on the outward edge of turn wheel 20.

In certain embodiments the system or method includes a computer processor and connected to the processor are network interface controllers, input/output controllers, storage devices and input output devices such as network interface controllers, graphical user interface, an input/output controller, an output device, an input device, and storage devices.

In embodiments wherein the impactor turn wheel 50 is rotated from a remote location, the processor of the computer may be connected to a network. A network may comprise a network controller connecting the processor to a network, where the client side, server side, and user network devices reside and both interact and operate communicatively over the network. These devices may also include a network database. The network can be a wide area network communications network, including an internet or an extranet or the network can be a local area network, including an intranet.

The input device can be at least one of a mouse, a keyboard, a touch screen, a joystick, a thumbwheel, a light pen wand, an audio microphone or an electronic, a copier system or machine, a hard copier scanner system or machine, and/or a radio frequency scanning device (RFID).

Regarding the processor, the processor includes a memory. Residing in the memory are a program unit and a dynamic repository. Residing in the dynamic repository is a plurality of database entry locations. Thus, each database entry location can hold and/or store a plurality of information and/or data including, but not limited to factors such as 1) pressure of the pipeline, 2) pressure against the ball 90, 3) temperature 4) time, 5) time since last ball 90 rotation and the like. These groups of information and data can be easily and programmatically accessed and exercised to provide various solutions to rotation of the impactor turn wheels 50.

The program may have computer readable and computer executable media that itself contains a plurality of computer programs, algorithms, software applications, including operations and procedures of the insurance method encoded as computer readable and computer executable program code in the form of a program product.

The processor may be a hardware device for executing software including software stored in the memory and in the program unit, including a program encoded as the reimbursement insurance method. The processor can be any custom made or commercially available, off-the-shelf processor, a central processing unit (CPU), one or more auxiliary processors, a semiconductor based microprocessor, in the form of a microchip or chip set, a microprocessor or generally any device for executing software instructions. The memory and the dynamic repository and the storage device or devices, and the plurality of databases can include any one of or a combination of volatile memory elements, including random access memory (including RAM, DRAM, SRAM and/or SDRAM) and non-volatile memory elements including read only memory (including ROM, erasable programmable read only memory, electronically erasable programmable read only memory EEPROM, programmable read only memory PROM, and/or compact disc read only memory CD-ROM or FLASH memory) magnetic tape, disk, diskette, cartridge, cassette and/or optical memory. The memory can have an architecture where various components are situated remotely from one another, but can be accessed by the processor.

In an exemplary embodiment, a user inputs a signal in a website connected to a server hosting executable software. The server receives a signal from the user input device such as a personal computer, which activates and initiates the computer executable program or code of the method of rotating the impactor turn wheels 50 by changing the polarity of all or a subset inward facing electromagnets 260, all or a subset of outward facing electromagnets 240 or both. The method, upon activation, performs other operations from the selection of signals received in the processor from the input device, causing the method to be executed by the processor to perform operations and procedures including calling algorithms and applications executed to perform operations and sub operations of the method of providing one or more electrical signals to the spokes 280 and the outer wheel support spokes 270 in order to change the polarity of all or a subset inward facing electromagnets 260, all or a subset of outward facing electromagnets 240 or both, in order to turn or rotate the impactor turn wheel 50 and thereby rotate the ball 90.

Impactor turn wheels utilized in the present disclosure are ideally suited for providing increased force for rotating a ball valve. As is well known, force equals mass times acceleration. In a typical ball valve design, there is typically little force applied to closing the valve other than that a constantly supplied force by a motor or by the muscles of the operator. In contrast, the quick rotation of an impactor turn wheel provides a fast acceleration of the hammer of the turn wheel until it impacts the strike bar of said turn wheel. Accordingly, the rapid acceleration associated with the free rotation of the impactor turn wheel combined with the mass of the impactor turn wheel hammer provides a great force against the strike bar of the turn wheel, thus causing stems and ball to rotate within the ball valve. This can be thought of as torque. Torque, moment or moment of force, is the tendency of a force to rotate an object about an axis, fulcrum, or pivot. Just as a force is a push or a pull, a torque can be thought of as a twist. In applications of the present disclosure, torque equals the length of the strike bar from the radius to the impact location times the actual force applied. Thus impactor turn wheels of the present disclosure can have greater torque by faster rotation of the turn wheel prior to its impact against the strike bar, a larger diameter of the impactor turn wheel, or both. For example, various embodiments of the valves of the present disclosure may have impactor turn wheels 1×, 2×, 3×, 4× or greater than the diameter of the ball within the ball valve.

Valves of the forgoing description are ideally suited for use in environments of high pressure. For example, various embodiments of valves of the present disclosure are useful in environments of pressures ranging from about 1 pound per square inch (psi) to 50,000 psi. In an alternate embodiment, valves of the present disclosure are useful in environments of pressures ranging from about 100 psi to about 40,000 psi. In an alternate embodiment, valves of the present disclosure are useful in environments of pressures ranging from about 1000 psi to about 20,000 psi. In an alternate embodiment, valves of the present disclosure are useful in environments of pressures ranging from about 5000 psi to about 15,000 psi.

Valves of the forgoing description are ideally suited for use in environments of high temperature. For example, various embodiments of valves of the present disclosure are useful in environments of temperatures ranging from about 1 degree Fahrenheit (° F.) to 2,500° F. In an alternate embodiment, valves of the present disclosure are useful in environments of temperatures ranging from about 100° F. to about 1,500° F. In an alternate embodiment, valves of the present disclosure are useful in environments of temperatures ranging from about 200° F. to about 1,000° F. In an alternate embodiment, valves of the present disclosure are useful in environments of temperatures ranging from about 250° F. to about 500° F.

Valves of the forgoing description additionally ideally suited for use in upstream petroleum production environments. For example, various embodiments of the valves of the present disclosure are useful in fracking operations. In other embodiments of the present disclosure, the ball valves are useful when positioned above a wellhead in a "Christmas tree" configuration comprising an aggregation of numerous valves to control pressure and flow of fluids during pumping operations. Ball valves with impactor turn wheels provide a greater advantage over existing gate valves due to the speed of opening and closing ball valves as compared to the length of time required to open and close gate valves.

From the foregoing description, one of ordinary skill in the art can easily ascertain the essential characteristics of this disclosure, and without departing from the spirit and scope thereof, can make various changes and modifications to adapt the disclosure to various usages and conditions. For example, references such as above, below, left, right, and the like are not meant as limiting but rather as a guide for orientation of the referenced element to another element. It will be understood that certain of the above-described structures, functions, and operations of the above-described embodiments are not necessary to practice the present disclosure and are included in the description simply for completeness of an exemplary embodiment or embodiments. In addition, it will be understood that specific structures, functions, and operations set forth in the above-described referenced patents and publications can be practiced in conjunction with the present disclosure, but they are not essential to its practice.

The disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes to the claims which come within the meaning and range of equivalency of the claims are to be embraced within their scope. Further, all published documents, patents, and applications mentioned herein are hereby incorporated by reference, as if presented in their entirety herein.

What is claimed is:

1. A magnetic rotary actuator comprising:
   a. a valve case having a first valve bore and a second valve bore;
   b. a valve member situated within the valve case and the valve member comprising a throughbore defining a flow axis;
   c. a stem having a proximal end attached to the valve member and a distal end extending away from the valve member and across the valve case through a stem bore;
   d. a turn wheel having a substantially circular shape, the turn wheel comprising:
      i. a turn wheel outer edge defining an outer circumference, the edge having an outward facing side oriented away from the distal end of the stem, and an inward facing side oriented toward the distal end of the stem;
      ii. an inward facing turn wheel stem bore, the turn wheel stem bore centered about equidistant from the turn wheel outer edge, the stem bore operatively attached to the distal end of the stem, the stem bore operable to independently rotate with respect to the outer edge;
      iii. at least one hammer, the at least one hammer affixed to the inward facing side of the turn wheel outer edge, the hammer oriented to strike at least one strike target;
      iv. at least one strike target extending outwardly from the stem or the turn wheel stem bore such that at least a portion of the strike target is configured to impact the hammer;
      v. a plurality of outward facing electromagnets, each electromagnet having an inward side operatively attached to the turn wheel outer edge, the plurality of outward facing electromagnets circumferentially positioned around the turn wheel outer edge;
      vi. an outer wheel with a circumference greater than the turn wheel outer edge and circumferentially positioned around the outward facing electromagnets, the outer wheel comprising a plurality of inward facing magnets circumferentially positioned around the plurality of outward facing electromagnets and an outer wheel support configured to position the outer wheel around the plurality of outward facing electromagnets; and
   e. conductive wires connecting the outward facing electromagnets to at least one controller configured to activate the plurality of outward facing electromagnets.

2. The magnetic rotary actuator of claim 1 wherein the at least one controller is configured to activate one or more of the plurality of outward facing electromagnets by changing the direction of the magnetic field of the one or more of the plurality of outward facing electromagnets.

3. The magnetic rotary actuator of claim 1 wherein the at least one controller is configured to activate one or more of the plurality of outward facing electromagnets by adjusting the current applied to the one or more of the plurality of outward facing electromagnets.

4. The magnetic rotary actuator of claim 1, wherein the outer wheel support is a frame, a plurality of spokes, a scaffold or a combination thereof.

5. The magnetic rotary actuator of claim 1 wherein the at least one controller is configured to activate one or more of the plurality of outward facing electromagnets by changing the polarity of the one or more of the plurality of outward facing electromagnets.

6. The magnetic rotary actuator of claim 1, wherein the at least one controller is a computer.

* * * * *